(12) United States Patent
Parpajola

(10) Patent No.: US 10,363,644 B2
(45) Date of Patent: Jul. 30, 2019

(54) NUMERICAL-CONTROL MACHINE TOOL

(71) Applicant: PARPAS S.p.A., Cadoneghe (IT)

(72) Inventor: Vladi Parpajola, Cadoneghe (IT)

(73) Assignee: PARPAS S.P.A., Cadoneghe (IT)

( * ) Notice: Subject to any disclaimer, the term of this patent is extended or adjusted under 35 U.S.C. 154(b) by 0 days.

(21) Appl. No.: 15/938,010

(22) Filed: Mar. 28, 2018

(65) Prior Publication Data
US 2018/0281137 A1  Oct. 4, 2018

(30) Foreign Application Priority Data
Mar. 31, 2017 (IT) .......................... 102017000035667

(51) Int. Cl.
*B23Q 11/14* (2006.01)
*B23Q 11/08* (2006.01)
(Continued)

(52) U.S. Cl.
CPC ............ B23Q 11/148 (2013.01); B23C 1/002 (2013.01); B23Q 1/012 (2013.01);
(Continued)

(58) Field of Classification Search
CPC ................. Y10S 408/71; Y10T 408/98; Y10T 409/30392; Y10T 409/303976;
(Continued)

(56) References Cited

U.S. PATENT DOCUMENTS 2,221,127 A * 11/1940 Bates ...................... B23F 23/12
165/206
6,059,494 A * 5/2000 Susnjara ............... B23Q 11/006
408/11
(Continued)

FOREIGN PATENT DOCUMENTS

DE        4214928 A1 * 11/1993  ......... B23Q 11/0816
DE       19956900 A1 *  5/2001  ......... B23Q 11/0816
(Continued)

OTHER PUBLICATIONS

Italian Search Report dated Nov. 29, 2017 for Corresponding Italian Application No. 201700035667 [Filed Mar. 31, 2017].

*Primary Examiner* — Erica E Cadugan
*Assistant Examiner* — Michael Vitale
(74) *Attorney, Agent, or Firm* — Gottlieb, Rackman & Reisman, P.C.

(57) ABSTRACT

A numerical-control machine tool is provided and includes a load-bearing beam which extends horizontally, has two axial ends resting in sliding manner on two lateral shoulders that rise from a basement and extend horizontally side by side so as to define a longitudinal corridor orthogonal to the longitudinal axis of the beam; a spindle-holding carriage which is movable on the load-bearing beam parallel to the longitudinal axis of the beam; a spindle-holding shaft which is fixed to the spindle-holding carriage in a vertical position, and is movable on the spindle-holding carriage parallel to its longitudinal axis; a front wall and a rear wall that close the two ends of the longitudinal corridor; an upper cover which closes the longitudinal corridor at the top; and an ambient conditioning unit which is adapted to bring and maintain the temperature of the air present inside the machining chamber around a given target value.

13 Claims, 2 Drawing Sheets

(51) Int. Cl.
*B23C 1/06* (2006.01)
*B23Q 1/01* (2006.01)
*B23C 1/00* (2006.01)

(52) U.S. Cl.
CPC ...... B23Q 11/0816 (2013.01); B23Q 11/0891 (2013.01); *Y10T 409/30392* (2015.01); *Y10T 409/303976* (2015.01); *Y10T 409/307728* (2015.01); *Y10T 409/308288* (2015.01)

(58) Field of Classification Search
CPC . Y10T 409/307728; Y10T 409/308288; Y10T 483/115; B23Q 1/01; B23Q 1/012; B23Q 11/0816; B23Q 11/0825; B23Q 11/148; B23C 1/002; B23B 39/006; B24B 7/005; B24B 7/224
USPC .... 408/241 G, 710; 409/134, 135, 202, 212; 483/3

See application file for complete search history.

(56) References Cited

U.S. PATENT DOCUMENTS

| | | | |
|---|---|---|---|
| 6,655,245 B2* | 12/2003 | Schuettel | B23Q 11/141 409/135 |
| 6,675,549 B1* | 1/2004 | Kaneda | B23Q 11/10 409/135 |
| 7,226,403 B2* | 6/2007 | Konvicka | B23Q 1/012 198/346.1 |
| 7,261,501 B2* | 8/2007 | Condrau | B23Q 11/0816 409/134 |
| 2006/0269375 A1 | 11/2006 | Takayama et al. | |
| 2006/0270540 A1* | 11/2006 | Takayama | B23Q 1/012 483/41 |
| 2010/0202848 A1* | 8/2010 | Tanizaki | B23Q 1/015 409/134 |
| 2015/0081078 A1* | 3/2015 | Frascati | B23C 1/002 700/114 |

FOREIGN PATENT DOCUMENTS

| | | |
|---|---|---|
| EP | 1195225 | 4/2002 |
| EP | 2828023 | 1/2015 |
| JP | 2002233928 | 8/2002 |

* cited by examiner

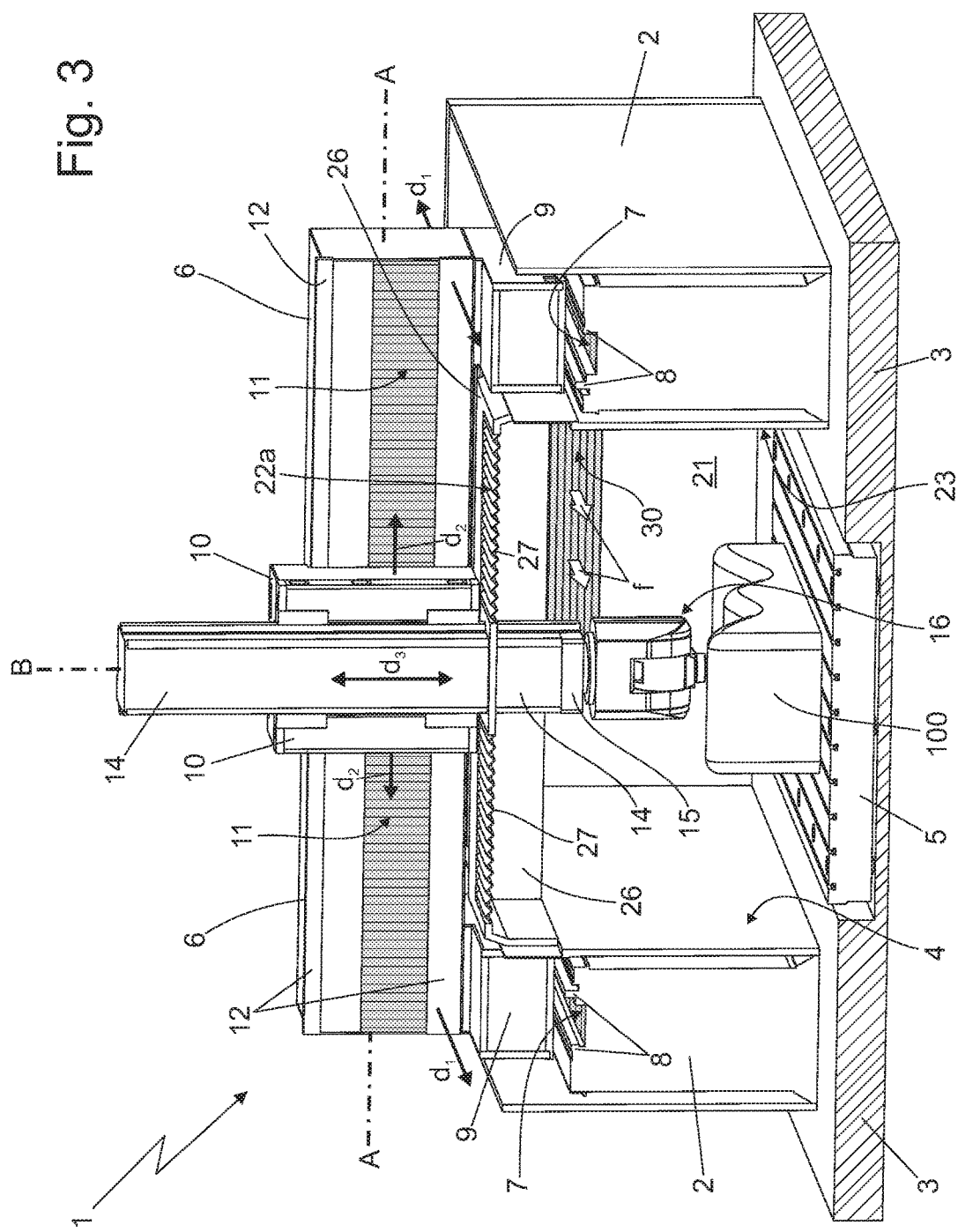

NUMERICAL-CONTROL MACHINE TOOL

PRIORITY CLAIM

This application claims priority from Italian Patent Application No. 102017000035667 filed on Mar. 31, 2017, the disclosure of which is incorporated by reference.

TECHNICAL FIELD

The invention relates to a numerical-control machine tool.

More in detail, the invention relates to a numerical-control gantry milling machine, to which explicit the following description will make explicit reference without this implying any loose in generality.

BACKGROUND OF THE INVENTION

As it is known, numerical-control gantry milling machines usually comprise: a workpiece platform, on which the workpiece to be machined is to be placed; a straight load-bearing beam with a high-rigidity structure, which extends horizontally above the workpiece platform, with the two axial ends resting in sliding manner on two lateral shoulders rising from the basement, on opposite sides of the workpiece platform, so as to allow the load-bearing beam to move horizontally above the workpiece platform in a horizontal direction perpendicular to the longitudinal axis of the beam; a spindle-holding carriage which is fixed in axially sliding manner to a lateral flank of the load-bearing beam, so as to be able to move along the beam parallel to the beam longitudinal axis; a spindle-holding shaft which is fixed in vertical position on the spindle-holding carriage with the capability of moving relative to the spindle-holding carriage parallel to its longitudinal axis, i.e. in vertical direction, so as to be able to vary the distance from the beneath-located workpiece platform; and an electric spindle which is housed in vertical position inside the spindle-holding shaft, with the tool-holding head projecting from the lower end of the shaft, so as to be able to reach the workpiece to be machined stationary on the workpiece platform beneath.

The workpiece(s) to be machined, on the other hand, is/are usually fixed on the workpiece platform with the aid of specific intermediate holding structures.

Unfortunately, these intermediate holding structures are made of metal material and this can lead to a significant reduction in the degree of precision of the machining carried out on the workpiece.

The heat produced by the material-removing machining, in fact, is transmitted to the holding structures which expand in an unforeseeable manner, thus moving the workpiece to be machined relative to the initial reference position, even by some tenths of millimeters. Movement that unfortunately results in an error in the positioning of the tool, with all the problems that this entails.

The numerical-control gantry milling machines, in fact, move the tool in space using a reference system which is based on the position of the workpiece to be machined immediately before the beginning of the machining, not on the position assumed after the thermal expansions which the holding structures are subjected to during the machining.

In order to solve this problem, during the machining, the workpiece to be machined is usually cooled down with jets of cooling liquid that remove a large part of the heat produced by the machining.

Despite this expedient, usually the numerical-control gantry milling machines are not capable of reaching machining precisions exceeding the hundredth of millimeter.

Experimental tests, in fact, have shown that, despite the use of jets of cooling liquid, the machining of the workpiece creates, on the workpiece platform and on the single holding structures, anomalous temperature distributions which cause local thermal expansions that temporarily alter, in an unforeseeable manner, the geometry of the single components, thus moving the workpiece to be machined relative to the initial reference position.

SUMMARY OF THE INVENTION

Aim of the present invention is therefore that of reducing the effects of the thermal expansions affecting the workpiece platform and the holding systems of the workpiece to be machined.

In compliance with the above aims, according to the present invention there is provided a numerical-control machine tool as defined in claim 1 and preferably, though not necessarily, in any one of the claims depending on it.

BRIEF DESCRIPTION OF THE DRAWINGS

The invention will now be described with reference to the accompanying drawings, which depict a non-limiting embodiment thereof, wherein:

FIG. 2 is an isometric view of the machine tool shown in FIG. 1, sectioned along the longitudinal midplane of the machine and with parts removed for clarity; whereas FIG. 3 is an isometric view of the machine tool shown in FIG. 1, with a section along a transverse plane and with parts removed for clarity.

DETAILED DESCRIPTION OF THE INVENTION

Figure 1:
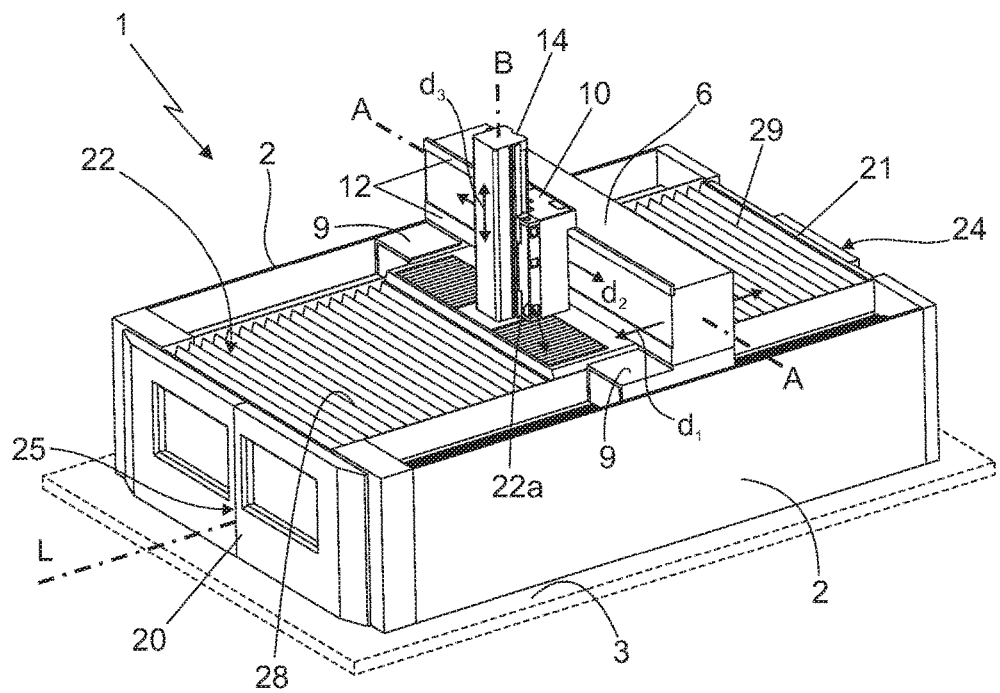
FIG. 1 is an isometric view of a numerical-control machine tool realized according to the teachings of the present invention, with parts removed for clarity.
Figure 2:
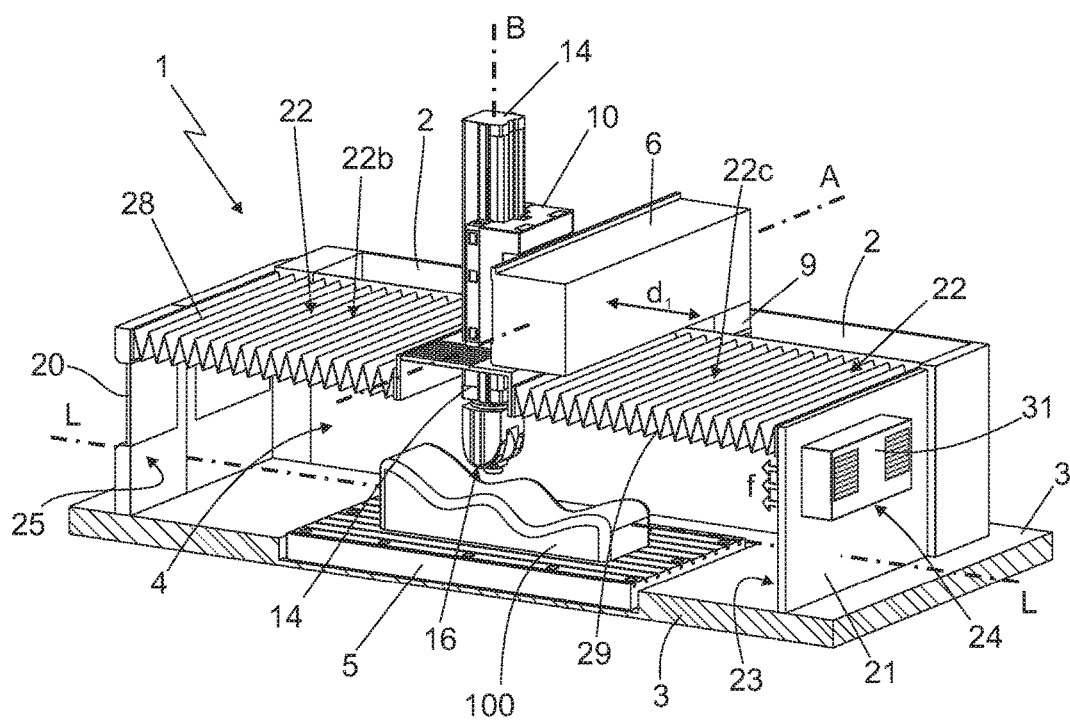

With reference to FIGS. 1, 2 and 3, number 1 denotes as a whole a numerical-control machine tool, which finds particularly advantageous use in the milling or boring of large-sized metal workpieces.

The numerical-control machine tool 1 basically comprises: two substantially straight, raised lateral shoulders 2 preferably made of metal material, which raise/protrude upwards from a substantially horizontal, basement 3 preferably made of reinforced concrete, and moreover extend horizontally on the basement 3 one beside the other, so as to form/delimit a substantially straight longitudinal corridor 4 extending astride the vertical midplane of the machine; and a workpiece platform 5 preferably made of a metal material, which is adapted to accommodate resting thereon the workpiece to be machined 100 and is located on the basement 3, within the longitudinal corridor 4 laterally delimited by the two lateral shoulders 2.

More in detail, the two lateral shoulders 2 are preferably substantially parallel to one another and to the vertical midplane of the machine, and extend horizontally on the basement 3 without interruptions, on opposite sides of the vertical midplane of the machine. In other words, the two lateral shoulders 2 lack transversal pass-through openings.

Preferably, each lateral shoulder 2 moreover is substantially parallelepiped in shape.

Workpiece platform 5, on the other hand, is preferably arranged substantially at centre of the longitudinal corridor 4, preferably more or less astride the vertical midplane of the machine. Preferably, the workpiece platform 5 furthermore has a plate-like structure.

The machine tool 1 moreover comprises: a substantially straight, transversal load-bearing beam 6 preferably made of a metal material, which extends astride the lateral shoulders 2 substantially horizontally and perpendicularly to the longitudinal axis L of longitudinal corridor 4, i.e. orthogonally to the vertical midplane of the machine, and has the two axial ends coupled in axially sliding manner to the two lateral shoulders 2, so as to be able to move along the two lateral shoulders 2, at a given height from the beneath-located basement 3 and the workpiece platform 5, in a first horizontal direction $d_1$ substantially parallel to the corridor longitudinal axis L and perpendicular to the longitudinal axis A of the same load-bearing beam 6; and a preferably electrically- or hydraulically-operated, beam moving device 7 which is capable of moving, on command, the load-bearing beam 6 back and forth along the lateral shoulders 2, in the direction $d_1$.

Preferably, the longitudinal corridor 4 furthermore has a width exceeding 3 meters, therefore the load-bearing beam 6 has a length exceeding 3 meters.

With reference to FIG. 3, in the example shown, in particular, the machine tool 1 preferably has, at top of each lateral shoulder 2, at least one and preferably a pair of straight rails 8 that extend horizontally and parallel to the longitudinal axis L of corridor 4, i.e. parallel to the vertical midplane of the machine, preferably substantially for the whole length of lateral shoulder 2.

Preferably each axial end of load-bearing beam 6, in turn, is provided with a resting slide-block 9 which is fitted/rests in axially sliding manner directly onto the straight rail/s 8 arranged on top of the lateral shoulder 2, so as to allow the load-bearing beam 6 to move back and forth along the lateral shoulders 2 in direction $d_1$.

The beam moving device 7, on the other hand, is preferably structured to move the two resting slide-blocks 9 in synchronized manner along the corresponding straight rails 8, so as to be able to move, on command, the whole load-bearing beam 6 in direction $d_1$, always keeping it parallel to itself and orthogonal to the vertical midplane of the machine.

In the example shown, in particular, the beam moving device 7 preferably includes a pair of linear electric motors, each of which is located on top of a respective lateral shoulder 2 and is capable of moving the corresponding resting slide-block 9 back and forth along the straight rails 8.

More in detail, each linear electric motor preferably comprises a fixed stator track and a travelling slide which is movable skimming the stator track. The stator track extends on top of lateral shoulders 2, among the straight rails 8. The travelling slide, in turn, is rigidly fixed to the resting slide-block 9, so as to locally face and skim over a portion of the stator track.

In a less sophisticated embodiment, however, the resting slide-blocks 9 could be moved back and forth along the straight rails 8 by means of rack-type moving mechanism or by means of a recirculating ball screw, in both cases operated by an electric or hydraulic motor.

With reference to FIGS. 1, 2 and 3, the machine tool furthermore comprises: a spindle-holding carriage 10 which is fixed to a lateral flank of load-bearing beam 6 with the capability of freely moving along the load-bearing beam 6 parallel to the beam longitudinal axis A, i.e. in a second horizontal direction $d_2$ substantially perpendicular to the direction $d_1$ and to the vertical midplane of the machine; and a preferably electrically- or hydraulically-operated, carriage moving device 11 which is capable of moving, on command, the spindle-holding carriage 10 back and forth along the load-bearing beam 6 in the horizontal direction $d_2$.

More in detail, in the example shown the machine tool 1 preferably has, on the lateral flank of load-bearing beam 6, at least one and preferably a pair of straight rails 12 that extend horizontally and parallel to the beam longitudinal axis A, preferably substantially for the whole length of load-bearing beam 6. The spindle-holding carriage 10, in turn, is preferably coupled in axially sliding manner to the straight rail or rails 12.

The carriage moving device 11, on the other hand, preferably includes a linear electric motor, which is arranged on the lateral flank of load-bearing beam 6 and is capable of moving the spindle-holding carriage 10 back and forth along the straight rails 12, in direction $d_2$.

More in detail, the linear electric motor of moving device 11 preferably comprises a fixed stator track and a travelling slide which is movable skimming the stator track. The stator track extends on the lateral flank of load-bearing beam 6, among the straight rails 12. The travelling slide, on the other hand, is rigidly fixed to the spindle-holding carriage 10, so as to locally face and skim over a portion of the stator track.

In a less sophisticated embodiment, also the spindle-holding carriage 10 may be moved back and forth along the straight guides 12 by means of rack-type moving mechanism or by means of a recirculating ball screw, in both cases operated by an electric or hydraulic motor.

With particular reference to FIG. 3, the machine tool 1 furthermore comprises: a substantially straight, spindle-holding shaft 14 which is preferably made of metal material and is fixed on the spindle-holding carriage 10 with its longitudinal axis B substantially perpendicular to the beam longitudinal axis A and with the capability of moving relative to the spindle-holding carriage 10 parallel to the longitudinal axis B; an electrically-operated, motor spindle 15 or the like which is firmly fixed on the spindle-holding shaft 14 so as to be able to reach the workpiece to be machined 100 stationary on the workpiece platform 5 beneath; and a preferably electrically- or hydraulically-operated, shaft moving device (not shown in the figures) which is capable of moving, on command, the spindle-holding shaft 14 relative to the spindle-holding carriage 10 parallel to the shaft longitudinal axis B so as to be able to move, on command, the motor spindle 15 away from or close to the basement 3 beneath.

More in detail, the spindle-holding shaft 14 is preferably fixed on the spindle-holding carriage 10 in a substantially vertical position, with the capability of axially moving relative to the spindle-holding carriage 10 in a direction $d_3$ substantially vertical and substantially perpendicular to directions $d_1$ and $d_2$. Similarly, the motor spindle 15 is preferably stably fixed on the spindle-holding shaft 14 in a substantially vertical position.

In addition, the motor spindle 15 is preferably provided with a tool-holding head 16, and is preferably fixed on the spindle-holding shaft 14 so that the tool-holding head 16 projects from the lower end of the spindle-holding shaft 14. Therefore, the shaft moving device is adapted to move the spindle-holding shaft 14 axially on command, so as to move the tool-holding head 16 of the motor spindle 15 away from or close to the basement 3 beneath.

Preferably, the tool-holding head 16 is moreover fixed to the motor assembly of motor spindle 15 and/or to the spindle-holding shaft 14 with the capability of rotating about a vertical reference axis and/or of traversing about a horizontal reference axis.

In addition, the tool-holding head 16 is preferably also fixed to the lower end of the spindle-holding shaft 14 and/or to the motor assembly of motor spindle 15 in rigid and stable, though easy detachable manner, so as to be easily replaced.

In the example shown, in particular, the spindle-holding shaft 14 preferably has a tubular structure, and the motor spindle 15 is preferably housed inside the spindle-holding shaft 14 in a substantially vertical position, with the tool-holding head 16 projecting from the lower end of the same spindle-holding shaft 14.

On the other hand, the shaft moving device preferably comprises: a vertical-axis recirculating ball screw which is interposed between the spindle-holding carriage 10 and the spindle-holding shaft 14; and an electric motor which is housed inside the spindle-holding carriage 10 and is adapted to drive into rotation the recirculating ball screw so as to axially move, on command, the spindle-holding shaft 14 for bringing the tool-holding head 16 close to or away from the basement 3 beneath, i.e. moving the spindle-holding shaft 14 in the direction $d_3$.

With reference to FIGS. 1, 2 and 3, the machine tool 1 finally comprises: a front wall 20 and rear wall 21, both preferably substantially vertical, which rise from the basement 3 at the two ends of the longitudinal corridor 4, so as to completely close the two ends of longitudinal corridor 4; and an upper cover 22 that extends astride the two lateral shoulders 2, at a predetermined height from the basement 3 and without interruptions substantially for the whole length of the lateral shoulders 2, so as to close the longitudinal corridor 4 at the top and form/delimit, together with the lateral shoulders 2 and the front 20 and rear 21 walls, a closed machining chamber 23 isolated from the outside preferably in substantially air-tight manner. The machining chamber 23 is obviously intended to accommodate the workpiece to be machined 100 and the upper cover 22 is engaged in pass-through and axially sliding manner by the spindle-holding shaft 14, so as to allow the motor spindle 15, or rather the tool-holding head 16 of motor spindle 15, to reach to the workpiece 100 stationary on the workpiece platform 5. The upper cover 22 is furthermore structured to follow the horizontal movements of spindle-holding shaft 14 in directions $d_1$ and $d_2$. In other words, the upper cover 22 has a deformable structure.

More in detail, the upper cover 22 preferably has a bellows structure.

With reference to FIGS. 2 and 3, the machine tool 1 is finally provided with an ambient conditioning unit 24, which is capable of bringing and maintaining, preferably substantially continuously for the entire duration of the machining of the workpiece P, the temperature of the air present inside the machining chamber 23 around a given target value selectable in advance by the user. Preferably, though not necessarily, the target value furthermore ranges between +15° C. and +25° C.

More in detail, the ambient conditioning unit 24 is preferably structured so as to be able to selectively introduce, into the machining chamber 23, a hot or cold air flow f with a controlled flowrate and/or temperature, thus to continuously maintain the temperature value of the air present in the machining chamber 23 within a predetermined tolerance range having a given width preferably lower than 1.4° C. and centred on the target value.

In order words, assuming—for example—that a target value of 20° C. has been pre-set, the ambient conditioning unit 24 introduces hot or cold air into the machining chamber 23, so as permanently maintain the temperature of the air present in the chamber 23 between 19.3° C. and 20.7° C.

Preferably, the ambient conditioning unit 24 is moreover adapted to maintain the pressure of the air inside the machining chamber 23 at a value higher than that of the external environment pressure, so as to prevent the external air from freely entering into the machining chamber 23 through the gaps present between the front 20 and rear 21 walls, the upper cover 22 and the two lateral shoulders 2.

With reference to FIGS. 1, 2 and 3, in the example shown, in particular, the front wall 20 includes an access door 25 preferably of sliding type and preferably manually openable, through which it is possible to introduce into the machining chamber 23 the workpiece to be machined 100.

Preferably, the rear wall 21, on the other hand, extends from one lateral shoulder 2 to the other substantially without interruptions and perpendicularly to the vertical midplane of the machine, so as to close substantially in air-tight manner the corresponding end of the corridor laterally delimited by the two lateral shoulders 2.

The upper cover 22, in turn, is preferably divided longitudinally into: a substantially plate-like, oblong central segment 22a preferably having a bellows structure, which extends immediately underneath the load-bearing beam 6, parallel to the beam longitudinal axis A, and is engaged in pass-through and axially sliding manner by the spindle-holding shaft 14; a substantially plate-like, front segment 22b preferably having a bellows structure, which connects the oblong central segment 22a to the front wall 20; and a substantially plate-like, rear segment 22c preferably having a bellows structure, which connects the oblong central segment 22a to the rear wall 21.

More in detail, the oblong central segment 22a is preferably fixed/connected in rigid manner to the beneath-located load-bearing beam 6, so as to move along the lateral shoulders 2 in direction $d_1$ together with the load-bearing beam 6. Preferably, the oblong central segment 22a furthermore has a bellows structure with the folding lines arranged orthogonally to the beam longitudinal axis A, so as to close the area beneath the load-bearing beam 6 although allowing anyway the spindle-holding shaft 14 to move horizontally in direction $d_2$, or rather parallel to the beam longitudinal axis A.

In the example shown, in particular, the oblong central segment 22a of upper cover 22 comprises: a substantially rectangular-shaped, rigid perimeter frame 26 preferably made of metal material, which extends astride the two resting slid-blocks 9 of load-bearing beam 6, immediately beneath and parallel to the load-bearing beam 6; and a rectangular panel 27 with a bellows structure, which is arranged to close the oblong through opening in the middle of the perimeter frame and is engaged in pass-through and axially sliding manner by the spindle-holding shaft 14.

Preferably, the rectangular panel 27 furthermore has the folding lines arranged orthogonally to the beam longitudinal axis A and the spindle-holding shaft 14 engages in pass-through and axially sliding manner a portion of said horizontal panel with bellows structure.

The front segment 22b, on the other hand, is provided with two longitudinal lateral edges extending parallel to the lateral shoulders 2, and with two transversal lateral edges extending orthogonally to the lateral shoulders 2.

The two longitudinal lateral edges are each arranged skimmed over a respective lateral shoulder 2, so as to minimize air leaks. The two transversal lateral edges, in turn, are fixed or anyway stably coupled one to the front wall 20 and the other to the oblong central segment 22a, or rather to the rigid perimeter frame of the oblong central segment 22a, so as to minimize air leaks.

Furthermore, the front segment 22b has a bellows structure with the folding lines arranged parallel to the longitudinal axis A of the load-bearing beam 6, so as to close the area between the load-bearing beam 6 and the front wall 20, although allowing anyway the load-bearing beam 6 to move horizontally in direction $d_1$, i.e. orthogonally to the beam longitudinal axis A.

More in detail, the front segment 22b preferably basically consists of a rectangular panel 28 with a bellows structure, which has a first lateral edge fixed to the upper edge of the front wall 20, and a second lateral edge fixed to the rigid perimeter frame of the oblong central segment 22a.

Preferably, the aforesaid rectangular panel with bellows structure furthermore has the folding lines arranged parallel to the longitudinal axis A of the load-bearing beam 6, so as to change its length according to the position of the lead-bearing beam 6.

Similarly to the front segment 22b, also the rear segment 22c is preferably provided with two longitudinal lateral edges extending parallel to the lateral shoulders 2, and with two transversal lateral edges extending orthogonally to the lateral shoulders 2.

The two longitudinal lateral edges of rear segment 22c are each skimmed over a respective lateral shoulder 2, so as to minimize air leaks. The two transversal lateral edges, in turn, are fixed or anyway stably coupled one to the rear wall 21 and the other to the oblong central segment 22a, or rather to the rigid perimeter frame of the oblong central segment 22a, so as to minimize air leaks. The rear segment 22c furthermore has a bellows structure with the folding lines arranged parallel to the longitudinal axis A of the load-bearing beam 6, so as to close the area between the load-bearing beam 6 and the rear wall 21 although allowing anyway the load-bearing beam 6 to move horizontally in direction $d_1$, i.e. orthogonally to the beam longitudinal axis A.

More in detail, the rear segment 22c preferably basically consists of a rectangular panel 29 with a bellows structure, which has a first lateral edge fixed to the upper edge of rear wall 21, and a second lateral edge fixed to the rigid perimeter frame of the oblong central segment 22a.

Preferably the rectangular panel 29 furthermore has the folding lines arranged parallel to the longitudinal axis A of the load-bearing beam 6, so as to change its length according to the position of the lead-bearing beam 6.

With reference to FIGS. 2 and 3, on the other hand, the ambient conditioning unit 24 is preferably structured to introduce hot or cold air into the chamber 23 through at least one air vent 30 preferably located on the rear wall 21.

More in detail, the ambient conditioning unit 24 preferably comprises: a fan coil 31 preferably fixed on the rear wall 21 at the air vent 30 and outside of the machine 1, and is adapted to feed a controlled-temperature air flow into chamber 23 through the air vent 30; and an electronic control unit (not shown) adapted to control the fan coil 31.

Preferably, the ambient conditioning unit 24 furthermore includes one or more temperature sensors (not shown), at least one of which is adapted to continuously detect the actual temperature of the air present inside the machining chamber 23 and which is preferably arranged inside the chamber 23.

The electronic control unit (not shown) is therefore adapted to control the fan coil 31 according to the signals arriving from said temperature sensor(s).

Operation of machine tool 1 is easily inferable from the description above and therefore does not require further explanations.

The advantages connected to the complete closing of the longitudinal corridor 4 laterally delimited by the lateral shoulders 2, and to the active control of the temperature value of the air inside the resulting closed compartment are remarkable.

Experimental tests have shown that, by keeping the temperature of the air inside the machining chamber 23 substantially constant during the machining of the workpiece 100, the temperature gradients among and along the various metal elements present inside the chamber 23 are significantly reduced.

This result leads to a drastic reduction in localized thermal expansions that alter in unforeseeable manner the geometry of the intermediate holding structures. As a consequence, the degree of precision of the machine tool does not decrease due to the presence of the intermediate holding structures.

It is finally clear that changes and variants can be made to the numerical-control machine tool 1 described above without however going beyond the scope of protection of the present invention.

For example, the machine tool 1 may lack the workpiece platform 5.

The invention claimed is:

1. A numerical-control machine tool, comprising:
   two side walls that rise from a base and that extend horizontally side by side so as to form a longitudinal corridor (L);
   a load-bearing beam which extends astride the two side walls perpendicular to a longitudinal axis of the corridor (L), and is movable along the two side walls in a first horizontal direction (di), which extends substantially parallel to the longitudinal axis of the corridor (L) and perpendicular to the longitudinal axis of the beam (A);
   a spindle-holding carriage which is movable on the load-bearing beam in a second horizontal direction (d2), which extends substantially parallel to the longitudinal axis of the beam (A);
   a spindle-holding shaft which is fixed to the spindle-holding carriage (10), the spindle-holding shaft having a longitudinal axis (B) that extends substantially perpendicular to the longitudinal axis of the beam (A);
   a motor spindle fixed to the spindle-holding shaft so as to be able to reach a workpiece to be machined, which workpiece is provided stationary on the base, wherein the spindle-holding shaft is movable on the spindle-holding carriage parallel to the longitudinal axis (B) so as to be able to vary the distance between the motor spindle and the workpiece;
   a front wall and a rear wall that each close a respective one of two opposing ends of the longitudinal corridor;
   an upper cover which extends astride the two lateral shoulders, at a predetermined height from the base, so as to close the longitudinal corridor at the top, and thereby delimit, together with the front and rear walls, a machining chamber, which is isolated from the outside and is only accessible via an access door of the front wall; and an ambient conditioning unit which is adapted to bring and maintain the temperature of air present inside the machining chamber around a given target value, wherein said upper cover being engaged in a pass-through and an axially sliding manner by the spindle-holding shaft, and being structured so as to follow the movements of the spindle-holding shaft in said first (di) and second (d2) horizontal directions.

2. The machine tool according to claim 1, wherein the ambient conditioning unit is adapted to selectively introduce, into the machining chamber, hot or cold air with a controlled flowrate and/or temperature, so as to continuously maintain a temperature value of the air present inside the machining chamber within a predetermined tolerance range.

3. The machine tool according to claim 2, wherein the ambient conditioning unit is adapted to maintain the pressure of the air inside the machining chamber at a value higher than that of the external environment pressure.

4. The machine tool according to claim 2, wherein the ambient conditioning unit introduces the hot or cold air into the machining chamber through at least one air vent, which is located on the rear wall.

5. The machine tool according to claim 2, wherein the ambient conditioning unit includes at least one temperature sensor adapted to continuously detect a current temperature of the air present inside the machining chamber.

6. The machine tool according to claim 1, wherein the upper cover has a bellows structure.

7. The machine tool according to claim 1, wherein the access door is of a sliding type and manually openable, and it is via the access door that the workpiece to be machined inside the machining chamber is introduced.

8. The machine tool according to claim 1, wherein the spindle-holding shaft is fixed to the spindle-holding carriage and is oriented so as to be able to move axially with respect to the spindle-holding carriage in a substantially vertical direction ($d_3$).

9. The machine tool according to claim 8, wherein the motor spindle is firmly fixed to the spindle-holding shaft in a substantially vertical position, and is provided with a tool-holding head that protrudes cantilevered from an end of the spindle-holding shaft.

10. The machine tool according to claim 9, wherein the tool-holding head is fixed to a motor assembly of the motor spindle and/or to the spindle-holding shaft with the capability of rotating about a vertical reference axis and/or of traversing about a horizontal reference axis.

11. The machine tool according to claim 9, wherein the tool-holding head is fixed to an end of the spindle-holding shaft and/or to the motor assembly of the motor spindle in a rigid and stable, yet detachable manner.

12. The machine tool according to claim 1, further comprising:

a workpiece platform which is adapted to accommodate thereon the workpiece to be machined, wherein the workpiece platform is located on the base, and inside the longitudinal corridor laterally delimited by the two side walls.

13. The machine tool according to claim 12, wherein the workpiece platform is made of metal material.

* * * * *